Patented Feb. 2, 1932

1,843,292

UNITED STATES PATENT OFFICE

NICHOLAS MEDVED, OF CANTON, OHIO

BEARING FOR COMBINED LOADS

Original application filed April 2, 1927, Serial No. 180,447. Divided and this application filed August 25, 1927. Serial No. 215,369.

My invention relates to anti-friction bearings adapted for resisting relatively great combined radial, thrust and impact loads, such as must be resisted in bearings for use for railroad car axles and the like, and this application is a division of my application for patent for anti-friction bearings, Serial No. 180,447, filed April 2, 1927.

For railroad service it is particularly desirable that the bearing parts be adjustable, and consequently may be made in wider limits of tolerance than in anti-friction bearings of usual types.

Moreover in railroad service the thrust set up in the bearing by the wheels and axle is frequently of very great magnitude, which it is dangerous to attempt to take up by only one or two sets of circumferentially spaced roller members.

Accordingly the objects of the present improvements include the provision for use in heavy service, such as railroad service, of an easily adjustable bearing, and a bearing provided with a plurality of sets of circumferentially spaced preferably double cone roller members and raceways therefor, which serve to distribute thrust, impact and radial loads between the several sets.

Figure 1:
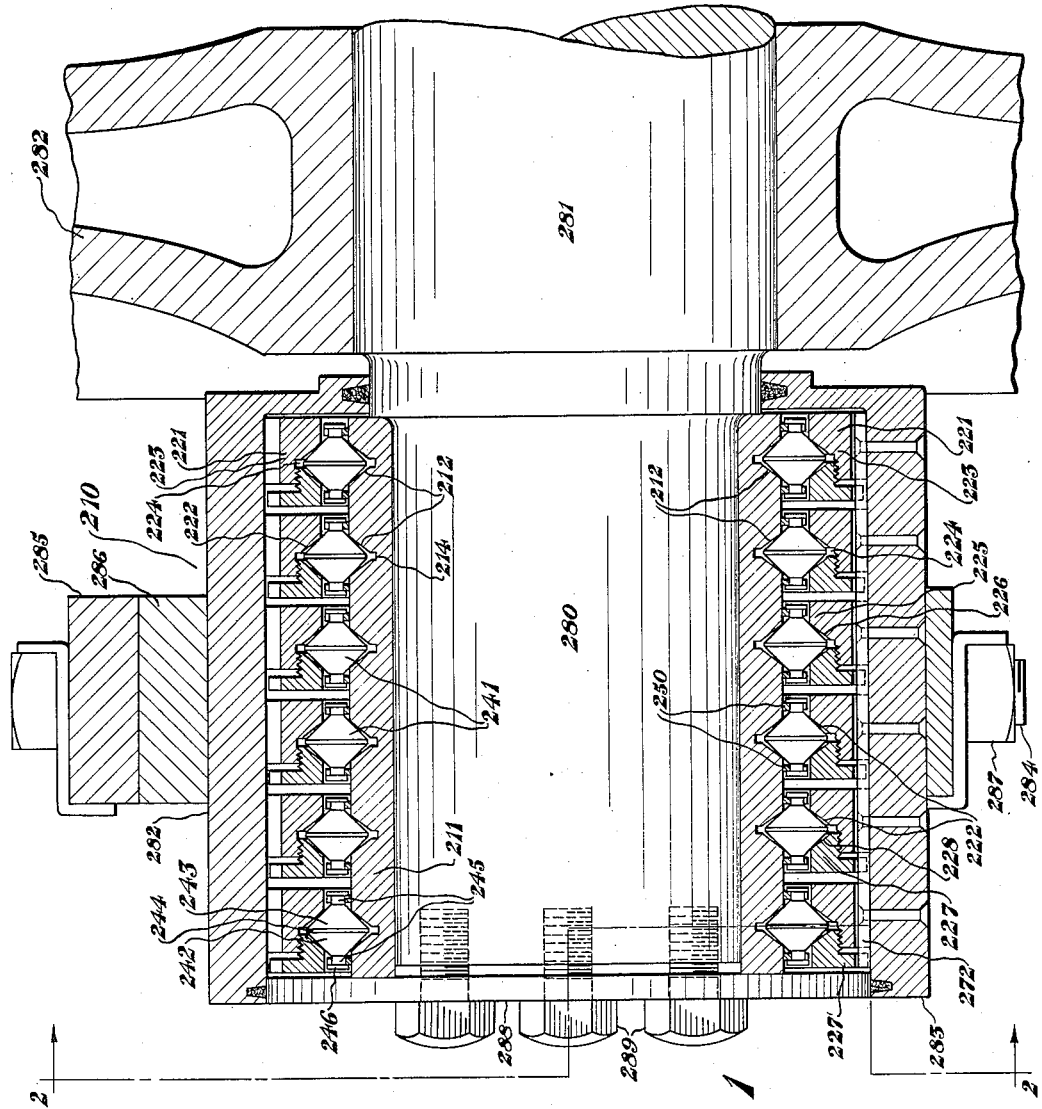
Figure 2:
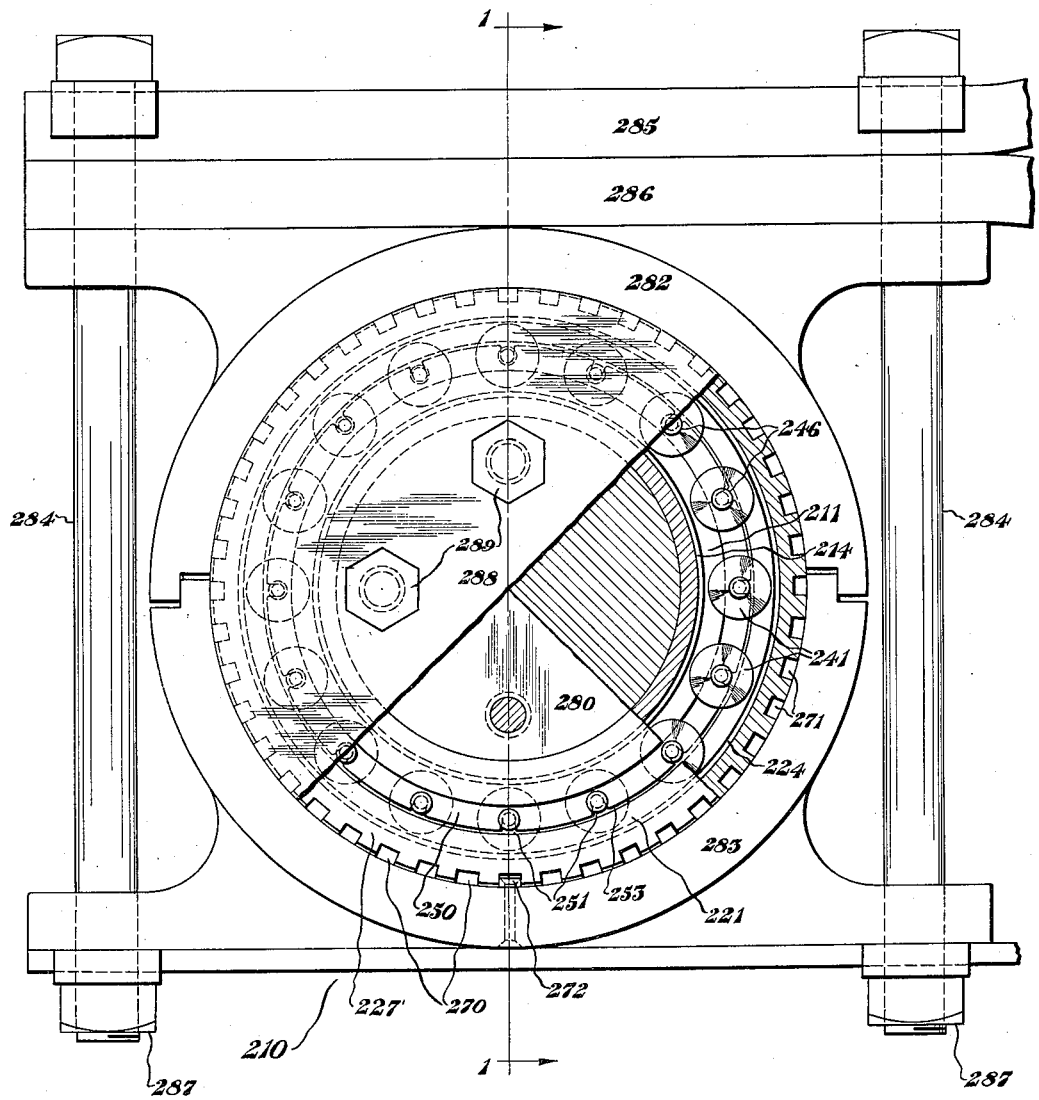

A preferred embodiment of the improvement is illustrated in the accompanying drawings forming part hereof, in which Figure 1 is an axial sectional view as on line 1—1, Fig. 2, of my improved combined radial, thrust, and impact bearing as for a railroad car axle bearing;

Fig. 2, an end elevation thereof with distant parts removed, and parts of the disk being broken away and portions of the bearing being broken away and illustrated in transverse section as on line 2—2, Fig. 1; and Fig. 3, a fragmentary view similar to Fig. 1 illustrating a modified form of the bearing.

Similar numerals refer to similar parts throughout the several views.

The embodiment of the improved anti-friction bearing indicated generally at 210 in Figs. 1 and 2 includes an inner tubular raceway sleeve 211 having a plurality of longitudinally spaced annular V raceways 212 therein, and each raceway is preferably provided at its bottom apex with a peripheral oil groove 214.

The bearing 210 also includes a plurality of outer raceway rings 221 each having an inner annular V raceway 222 therein, and each ring 221 preferably includes a raceway collar 223 having a preferably centrally located peripheral oil groove 224 on its inner surface, and at one side thereof an inwardly extending flange 225 having one beveled face 226 for forming one side of the V raceway; and extending from the other side of the oil groove 224 opposite the flange 225, the collar 223 is internally threaded; and for screwing therein a raceway ring-screw 227 is provided and has a beveled face 228 for forming the other side of the annular V raceway 222, each ring-screw 227 thereby being adapted for varying the distance between the sides of each annular V raceway.

The bearing 210, thus including the inner raceway sleeve 211 having a plurality of outer annular V raceways 212, and a plurality of outer adjustable raceway rings 221 each having an inner annular V raceway 222, is provided with a plurality of sets of circumferentially spaced double cone roller members 241 for rolling in the several V grooves of the several raceways, and the roller members 241 each includes integral base abutting cones 242 and 243 preferably having a relatively short cylindric section 244 between the base abutting cones, and being preferably provided with guide trunnions 245 extending outwardly from the spaced apexes of the cones, and the trunnions 245 being provided at their outer ends with flange heads 246.

For circumferentially spacing each set of the double roller cone members 241 from each other in the raceways, each set may be provided with a pair of ring spacers 250, each of which has a plurality of outer spaced notches 251 cut in the outer peripheral edge 253 thereof, and the notches are adapted to receive the trunnions 245 of the roller members, and the flange heads 246 of the trunnions serve to prevent lateral displacement of the ring spacers.

In order to provide for a locking of each ring-screw in a desired position of adjustment, each ring-screw 227 may be provided with an out-turned flange 227' extending over the end of its collar 223 and a plurality of key notches 270 may be provided in each flange 227', and a plurality of key notches 271 may be provided in the outer peripheral face of each collar 223 for registering with the flange notches 270, a pair of the registering flange and collar notches being adapted to receive a suitable locking key 272.

For use in railway service, the sleeve 211 of the bearing 210 is fitted upon a journal 280 of a railway car axle 281 carrying in a usual manner a wheel 282 adjacent the journal 280, and there being a journal and a wheel at the other end of the axle, not shown.

An upper bearing block 282 is provided for resting upon the upper half of the outer surfaces of the collars 223, and a lower bearing block 283 is adapted to fit about the lower half of the surfaces of the collars 223, and suitable vertical bolts 284 passing through suitable apertures in the upper and lower bearing blocks and cross members 285 and 286 of the car truck, are adapted for clamping the bearing blocks about the bearing 210.

The key 272 is preferably secured to the lower bearing block 283, providing an easy means of adjusting the several ring-screws 227 by unloosening the nuts 287 of the bolts 284, dropping the bearing block 283 so that the key 272 carried thereby is below the notches, and adjusting the same to line up and register with each other after which the nuts 287 may be tightened and the bearing blocks clamped about the bearing collars, the key 272 fitting into the several registered notches for locking the outer collars and ring-screws in the desired position of adjustment.

A suitable end cover and clamping plate 288 may be provided for clamping the sleeve 211 upon the journal 280, and may be secured to the journal 280 as by means of a plurality of cap screws 289 screwed through the cover plate 288 and into the end of the journal 280.

An easily made and adjusted bearing for the journal 280 of the railway axle 281 is thus provided which is adapted to distribute any radial, impact and thrust loads which it may receive between the several sets of roller members 241.

As illustrated for the bearing 210, the angles between the sides of the inner and of the outer raceways are each slightly less than the angle between elements of the abutting double cone roller members 241; whereby provision is made for linear contact at the outer ends of each cone of each roller member with the outer zones of the raceway sides; and whereby, between the linear contacts, tapered spaces are provided between the surfaces of the roller members and the surfaces of the raceways, and these spaces are preferably filled with a suitable lubricant, thereby increasing the ease of operation of the bearing.

Morever, the provision of linear contact at the outer ends of the roller members, and of the central tapered spaces, and the fact that the outer raceway ring has a minimum radial thickness at the plane of the oil grooves, provides resilience for the bearing; and the inner surfaces of the outer raceways approach and retreat from the outer surfaces of the roller members when the bearing is being subjected to varying loads, thereby successively reducing and increasing the size of the tapered spaces and subjecting the lubricant therein to a varying pressure.

The modified embodiment 510 of the bearing, illustrated in Fig. 3, is substantially identical with the bearing 210, with the exception that the angle between the sides of the inner annular V raceway 522 in the outer annular raceway ring 521, is greater than the angle between the elements of the abutting double cone roller members 541, while the angle between the sides of each outer annular V raceway 512 in the inner tubular raceway sleeve 511, is slightly less than the angle between elements of the abutting double cone roller members 541; whereby provision is made for linear contact at the outer end of each cone of each roller member with outer zones of the sides of its raceway 512, and with inner zones of the sides of its raceway 522, thereby distributing the wear over the surfaces of the roller members, and providing for resilience in the roller members themselves.

The roller members 541 each includes integral base abutting cones 542 and 543 preferably having an outer annular oil groove 544 between the base abutting cones, and otherwise being substantially identical with the roller members 241.

The provision of the oil groove 544 for each of the roller members 541 further insures proper lubrication of the bearing.

I claim:

1. An anti-friction bearing and the like including an inner raceway ring having an outer annular raceway formed therein, an outer raceway ring having an inner annular raceway formed therein, and roller members rolling in the raceways, one of the rings including a raceway collar having a face forming one side of its raceway, and the collar being theaded, and a threaded raceway ring screw adapted for screw connection with the threaded collar and having a face forming the other side of its raceway, a key notch in a peripheral face of the collar and extending in the direction of the bearing axis, and a similarly extending key notch in a peripheral face of the ring screw, the notch of the collar being adapted to register with the notch of the ring screw for receiving a locking key.

2. An anti-friction bearing and the like including an inner raceway sleeve having an outer annular raceway formed therein, an outer raceway ring having an inner annular raceway formed therein, and roller members rolling in the raceways, and the ring including a raceway collar having a face forming one side of the inner raceway, and the collar being threaded, and a threaded raceway ring screw adapted for screw connection with the threaded collar and having a face forming the other side of the inner raceway, a key notch in an outer peripheral face of the collar, a key notch in an outer peripheral face of the ring screw, the notch of the collar being adapted to register with the notch of the ring screw for receiving a locking key.

3. An anti-friction bearing and the like including a sleeve having a plurality of raceways formed therein, a plurality of rings each having a raceway formed therein opposite one of the first mentioned raceways, and roller members rolling in the opposed raceways, each of the rings including a raceway collar having a face forming one side of the ring raceway, and the collar being threaded, and a threaded raceway ring screw adapted for screw connection with the collar and having a face forming the other side of the ring raceway, a key notch in a peripheral face of the collar and a key notch in a peripheral face of the ring screw, the notches of the several collars being adapted to register with the notches of the several ring screws and with each other for receiving a common locking key.

4. An anti-friction bearing and the like including a sleeve having a plurality of raceways formed therein, a plurality of rings each having a raceway formed therein opposite one of the first mentioned raceways, and roller members rolling in the opposed raceways, each of the rings including a raceway collar having a face forming one side of the ring raceway and the collar being threaded, and a threaded raceway ring screw adapted for selective connection with the collar and having a face forming the other side of the ring raceway, a key notch in a peripheral face of the collar and a key notch in a peripheral face of the ring screw, the notches of the several collars being adapted to register with the notches of the several ring screws and with each other, separable bearing blocks and connecting means therefor adapted for clamping the several collars, and a key on one of the bearing blocks fitting into the several registered notches for locking the collars and ring screws in desired positions of adjustment.

5. An anti-friction bearing and the like including an inner raceway ring having an outer annular raceway formed therein, an outer raceway ring having an inner annular raceway formed therein, and roller members rolling in the raceways, one of the rings including adjustable screw connected annular members each having a face forming one side of its raceway, a key notch in a peripheral face of one of the annular members, and a plurality of spaced key notches in a peripheral face of the other annular member, the notch of the one member being adapted to register with one of the notches of the other member for receiving a locking key.

6. An anti-friction bearing and the like including a sleeve having a plurality of raceways formed therein, a plurality of rings each having a raceway forced therein opposite one of the first mentioned raceways, and roller members rolling in the opposed raceways, each of the rings including adjustable screw connected annular members each having a face forming one side of its raceway, a key notch in a peripheral face of one of the annular members of each adjustable ring, and a plurality of spaced key notches in a peripheral face of the other annular member of each adjustable ring, the notch of the one member of each of the rings being adapted to register with one of the notches of the other member of each of the rings and with each other for receiving a locking key.

7. An anti-friction bearing and the like including a sleeve having a plurality of raceways formed therein, a plurality of rings each having a raceway formed therein opposite one of the first mentioned raceways, and roller members rolling in the opposed raceways, each of the rings including adjustable screw connected annular members each having a face forming one side of its raceway, a key notch in a peripheral face of one of the annular members of each adjustable ring, and a plurality of spaced key notches in a peripheral face of the other annular member of each adjustable ring, the notch of the one member of each of the rings being adapted to register with one of the notches of the other member of each of the rings and with each other, separable bearing blocks and connecting means therefor adapted for clamping some of the ring members, and a key on one of the bearing blocks fitting into the several registered notches for locking the adjustable ring members in desired positions of adjustment.

In testimony that I claim the above, I have hereunto subscribed my name.

NICHOLAS MEDVED.